United States Patent [19]

Redden

[11] Patent Number: 5,517,561
[45] Date of Patent: May 14, 1996

[54] SUBSCRIBER UNIT WHICH IS RESPONSIVE TO ANNUNCIATION MESSAGES

[75] Inventor: James P. Redden, Mesa, Ariz.

[73] Assignee: Motorola, Inc., Schaumburg, Ill.

[21] Appl. No.: 394,444

[22] Filed: Feb. 24, 1995

Related U.S. Application Data

[63] Continuation of Ser. No. 936,500, Aug. 28, 1992, abandoned.

[51] Int. Cl.$^6$ .................................................. H04M 1/56
[52] U.S. Cl. ........................... 379/142; 379/373; 379/374
[58] Field of Search .................................... 379/142, 373, 379/374, 375

[56] References Cited

U.S. PATENT DOCUMENTS

| | | | |
|---|---|---|---|
| 4,263,480 | 4/1981 | Levine | 179/2 |
| 4,330,780 | 5/1982 | Masaki | 340/825.44 |
| 4,720,848 | 1/1988 | Akiyama | 379/374 X |
| 4,759,056 | 7/1988 | Akiyama | 379/142 X |
| 4,856,055 | 8/1989 | Schwartz | 379/374 |
| 4,894,861 | 1/1990 | Fujioka | 379/142 X |
| 5,014,301 | 5/1991 | Maltezos | 379/155 |
| 5,067,150 | 11/1991 | Satomi et al. | 379/142 X |

FOREIGN PATENT DOCUMENTS

| | | |
|---|---|---|
| 8704309 | 7/1987 | European Pat. Off. . |
| 9214329 | 8/1992 | European Pat. Off. . |
| 2197103 | 5/1988 | United Kingdom . |

*Primary Examiner*—Creighton Smith
*Attorney, Agent, or Firm*—Kevin K. Johanson; Robert M. Handy; Walter W. Nielsen

[57] ABSTRACT

A radio subscriber communication unit maintains an annunciation memory which stores a repertoire of annunciations. When the subscriber unit receives annunciation data messages from a communication network, a particular one of the annunciations is selected and presented to the user of the subscriber unit. An audible segment of the annunciation is passed through a vocoder, amplified, and routed to a speaker for presentation to the user. When annunciations are repeated, a second message may be received to instruct subscriber unit to cease presenting an annunciation.

31 Claims, 7 Drawing Sheets

1

SUBSCRIBER UNIT WHICH IS RESPONSIVE TO ANNUNCIATION MESSAGES

This application is a continuation of prior application Ser. No. 07/936,500 filed Aug. 28, 1992, now abandoned.

TECHNICAL FIELD OF THE INVENTION

The present invention relates generally to communication networks that provide communication services for subscribers. More specifically, the present invention relates to the presentation of signalling and other information to a user of a subscriber communication unit.

BACKGROUND OF THE INVENTION

Subscriber communication units, including telephone instruments and other telephonic devices, cellular radiotelephones, mobile radios, and the like, often link a human operator or user with a communication network. The user may converse with others through the communication network. These subscriber units use various techniques for presenting information to users concerning the state of communication services or of the subscriber unit. For example, dial tones, ringing sounds, and busy signals are common audible annunciations that a subscriber unit presents to a user. Many subscriber units include indicator lights and displays to visually present annunciations describing dialled telephone numbers, active telephone lines in multiple line units, service conditions, and the like.

Various signalling practices that have evolved from landline communication systems are undesirable in connection with the presentation of annunciations in radio communication systems. For example, many linguistic or voice messages and audio sounds that are presented to a user through a subscriber unit are generated at a central switching office and transmitted to the subscriber unit for presentation to the user. Such messages and sounds consume a greater amount of the electromagnetic spectrum than may be justified for the quantum of information being conveyed. As more and more calls are communicated using a finite amount of the electromagnetic spectrum, the need to utilize the spectrum as efficiently as possible becomes acute.

Moreover, conventional signalling practices do not adequately account for the fact that some of the people using a communication system speak foreign languages. Subscribers who roam in foreign-speaking areas often have difficulty understanding voice messages which are not voiced in a language with which they are conversant. This problem becomes especially troublesome in communication systems which span areas of coverage within which many languages are spoken. And, the troublesome nature of this problem is multiplied for radio communication systems which tend to have numerous diverse system states about which explanations need to be communicated to subscribers.

Still further, conventional practices are poorly suited for various signalling annunciations which must be presented to users of digital communication systems. In digital communication systems, voice data are often encoded and/or compressed for transmission through a communication network. When a circuit between two parties has been established and a call is ongoing, patching into the call to deliver additional signalling information, such as a call waiting "click", is a complicated matter due to the encoding. One possible technique for patching into an ongoing call might be to route the ongoing call to a central location, decode the digitized call data, mix the decoded call data with signalling data, re-encode the mixed call and signalling data, and route the re-encoded mixture of call and signalling data to the call's destination. However, this technique is highly undesirable due to the significant additional communication resources needed. The allocation of significant additional resources to convey simple signalling information can waste scarce electromagnetic spectrum and other network resources.

SUMMARY OF THE INVENTION

Accordingly, it is an advantage of the present invention that an improved subscriber unit and method of operating a subscriber unit is provided.

Another advantage of the present invention is that a subscriber unit is provided for which only an insignificant amount of spectrum need be allocated for conveying signalling information.

Another advantage of the present invention is that a subscriber unit is provided which permits a user to roam in areas where foreign languages are spoken and still receive voice messages in a preferred language.

Yet another advantage is that a subscriber unit is provided which accommodates the interleaving of signalling messages and encoded audio data without requiring the allocation of additional channels.

The above and other advantages of the present invention are carried out in one form by a method of operating a subscriber communication unit that communicates with a communication network, has memory for storing data, and has a user interface through which a user of the subscriber unit perceives annunciations. The method calls for storing annunciation data in the memory. The annunciation data serves as a repertoire of annunciations. Data transmitted from the communication network is monitored to detect an annunciation data message. Annunciation data messages instruct the subscriber unit to perform an annunciation, and annunciation data messages convey identity data which specify one of the annunciations. When an annunciation data message is detected, a portion of the annunciation data is selected. The selected portion of annunciation data is chosen in response to the identity data. In addition, the user interface is controlled with the selected portion of the annunciation data to present the specified annunciation to the user.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
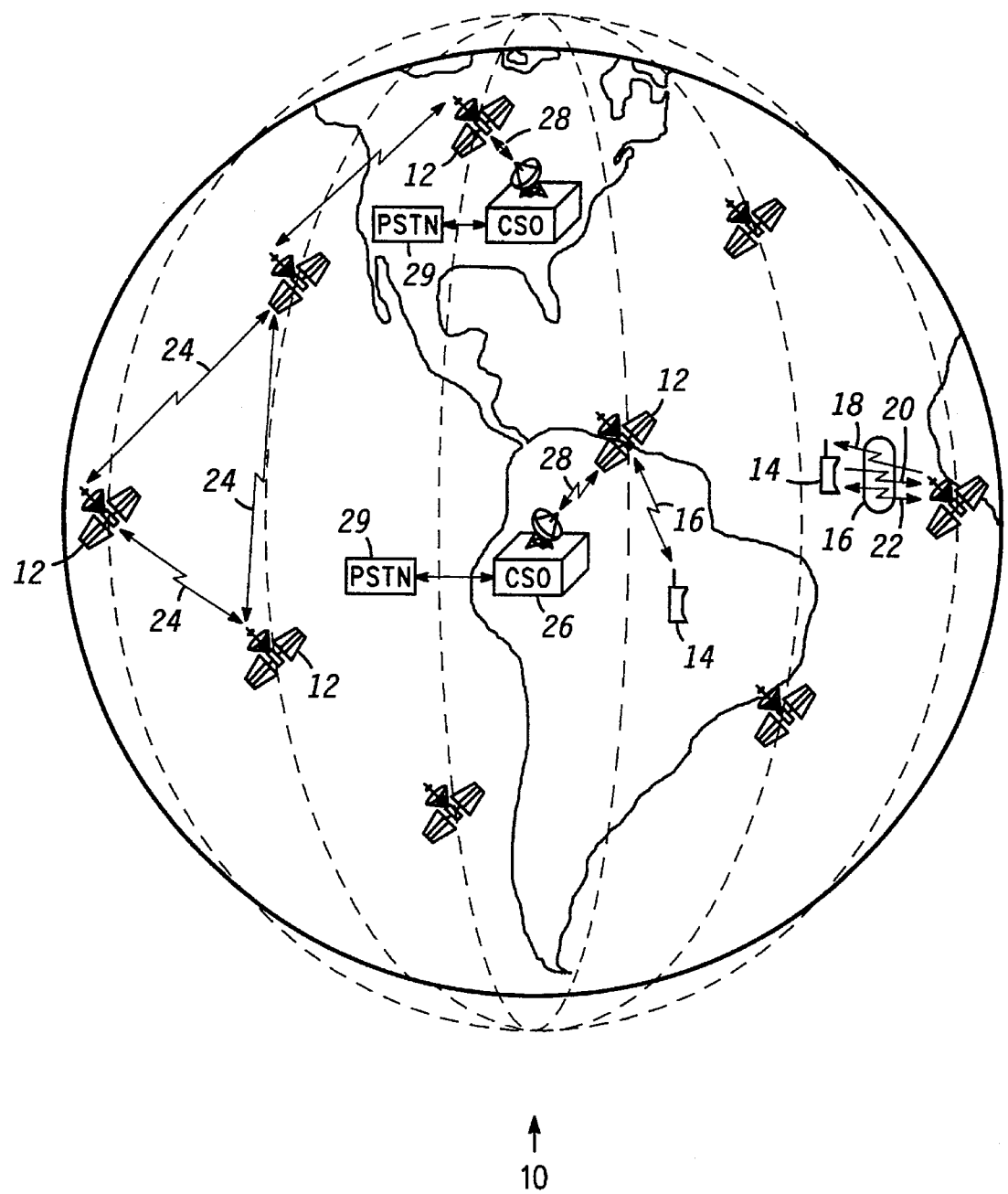
FIG. 1 shows a layout diagram of an environment within which a subscriber unit constructed in accordance with the teaching of the present invention operates.

FIG. 1 illustrates a world-wide, satellite-based communication network 10 with which the preferred embodiments of the present invention may be practiced. Network 10 includes a constellation of switching nodes 12 that are dispersed around the earth. In the preferred embodiments, nodes 12 are orbiting satellites. Network 10 preferably includes a sufficient number of satellites 12 so that communication with one of the satellites 12 may take place from substantially any point on the surface of the earth through the use of a subscriber unit 14.

Network 10 may accommodate any number, potentially in the millions, of subscriber units 14. In the preferred embodiments of the present invention, subscriber units 14 communicate with nearby satellites 12 via subscriber links 16. Links 16 encompass a limited portion of the electromagnetic spectrum that is divided into numerous channels. As a minimum, a satellite 12 continuously transmits over one or more broadcast channels 18. Subscriber units 14 synchronize to broadcast channels 18 and monitor broadcast channels 18 to detect data messages which may be addressed to them. Subscriber units 14 may transmit messages to satellites 12 over one or more random access channels 20. Broadcast channels 18 and random access channels 20 are not dedicated to any one subscriber unit 14 but are shared by all subscriber units 14 currently within view of a satellite 12.

On the other hand, traffic channels 22 are two-way channels that are assigned to particular subscriber units 14 by satellites 12 from time to time. In the preferred embodiments of the present invention, a digital format is used to communicate data over channels 18–22, and traffic channels 22 support real-time communications. At least one traffic channel 22 is assigned for each call, and each traffic channel 22 has sufficient bandwidth to support, as a minimum, a two-way voice conversation. To support real-time communications, a time division multiple access (TDMA) scheme is used to divide time into frames, preferably in the 60–90 millisecond range. Particular channels 22 are assigned particular transmit and receive timeslots, preferably having durations in the 3–10 millisecond range, within each frame. Analog audio signals are digitized so that an entire frame's signal is transmitted or received in a single short high speed burst during an allotted timeslot. Preferably, each satellite 12 supports up to a thousand or more traffic channels 22 so that each satellite 12 can simultaneously service a like number of independent calls.

Satellites 12 communicate with other nearby satellites 12 through cross links 24. Thus, a communication from a subscriber unit 14 located at any point on or near the surface of the earth may be routed through the constellation of satellites 12 to within range of substantially any other point on the surface of the earth. A communication may be routed down to a subscriber unit 14 on or near the surface of the earth from a satellite 12 using a subscriber link 16. Alternatively, a communication may be routed down to or up from any of many central switching offices (CSOs) 26, of which FIG. 1 shows only two, through earth links 28. CSOs 26 preferably couple to local public switched telecommunications networks (PSTNs) 29. Communications from network 10 may be routed through PSTNs 29 to any telephonic instrument or other device which also couples to a PSTN throughout the world. CSOs 26 are preferably distributed over the surface of the earth in accordance with geo-political boundaries. In the preferred embodiments, each satellite 12 may communicate with up to four CSOs 26 and over a thousand subscriber units 14 at any given instant.

Accordingly, network 10 may establish a bidirectional communication circuit or two unidirectional circuits through the constellation of satellites 12 between any two subscriber units 14, between any subscriber unit 14 and any CSO 26, between any two CSOs 26, or between any subscriber unit 14 and any telephonic device. Any two ends of a given connection may be located in areas of the world where different languages are spoken, and users of subscriber units 14 may carry their subscriber units 14 with them for use in any region of the world where any language may be spoken.

Figure 2:
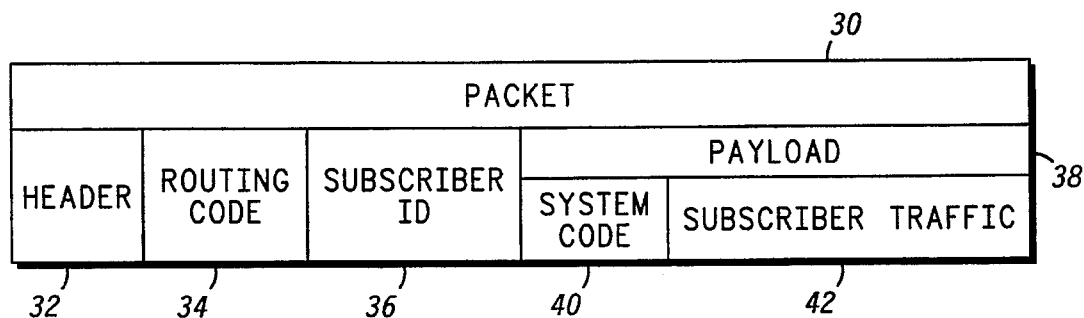
FIG. 2 shows a block diagram of a digital data packet utilized by a communication network and the subscriber unit.

As discussed above, communications in the preferred embodiments are configured into a digital format. FIG. 2 shows a block diagram of an exemplary data packet 30 that may be used to transport a communication to a subscriber unit 14 (see FIG. 1). Packet 30 includes a header 32, which carries data identifying a type characterization to be associated with packet 30, a length to be associated with packet 30, and any other information conventionally included in data packet headers. The type characterization may indicate whether the packet 30 exclusively conveys system control messages or whether it conveys subscriber traffic. A routing code 34 is included to instruct network 10 (see FIG. 1) where to deliver packet 30.

A subscriber ID 36 represents a code that uniquely identifies a subscriber unit 14 and that is known to the identified subscriber unit 14 and any satellite 12 (see FIG. 1) providing a traffic channel 22 (see FIG. 1) to a subscriber unit 14. A subscriber unit 14 monitors subscriber IDs 36 of packets 30 transmitted over a broadcast channel 18 (see FIG. 1) to determine if the packets 30 are intended for it. A satellite 12 uses subscriber IDs 36 of packets 30 that carry subscriber traffic to route such packets 30 to the traffic channels 22 assigned to the identified subscriber units 14.

Header 32, routing code 34, and subscriber ID 36 represent overhead data which serve to get packet 30 to its destination. At the packet's destination, payload data 38 are consumed. In other words, the purpose of sending packet 30 to a destination is typically to deliver payload data 38, not header 32, routing code 34, or subscriber ID 36. Payload data 38 includes either system control data 40 or system control data 40 together with subscriber traffic 42. System control data 40 are commands or messages which are interpreted and acted upon by subscriber units 14. These commands are typically very short. When system control data 40 are delivered over a broadcast channel 18, subscriber traffic 42 is omitted, and the resulting packet 30 is very short so that as many messages as possible may be broadcast over the broadcast channel 18. Subscriber traffic 42 represents all subscriber data transported in the course of a call. When a packet 30 is delivered over a traffic channel 22, a significant amount of subscriber traffic is appended. As discussed above, a digitized version of an entire frame of conversational audio is conveyed by subscriber traffic 42.

Compared to the size of subscriber traffic 42, the length of system control data 40 is insignificant. Thus, system control data 40 may be delivered to a subscriber unit 14 along with subscriber traffic 42 while a call is ongoing. Examples of system control messages which may be delivered with subscriber traffic 42 via a traffic channel 22 include messages which inform a subscriber unit 14 that the other party to a call has "hung-up," that another call is waiting for the subscriber unit 14, and any number of annunciation data messages which result in a voice message or other form of annunciation being presented to the user of subscriber unit 14. An annunciation which may be presented to a user while a call is ongoing may, for example, warn a user when communication services are soon expected to become unavailable or when any other service condition warrants.

Figure 3:
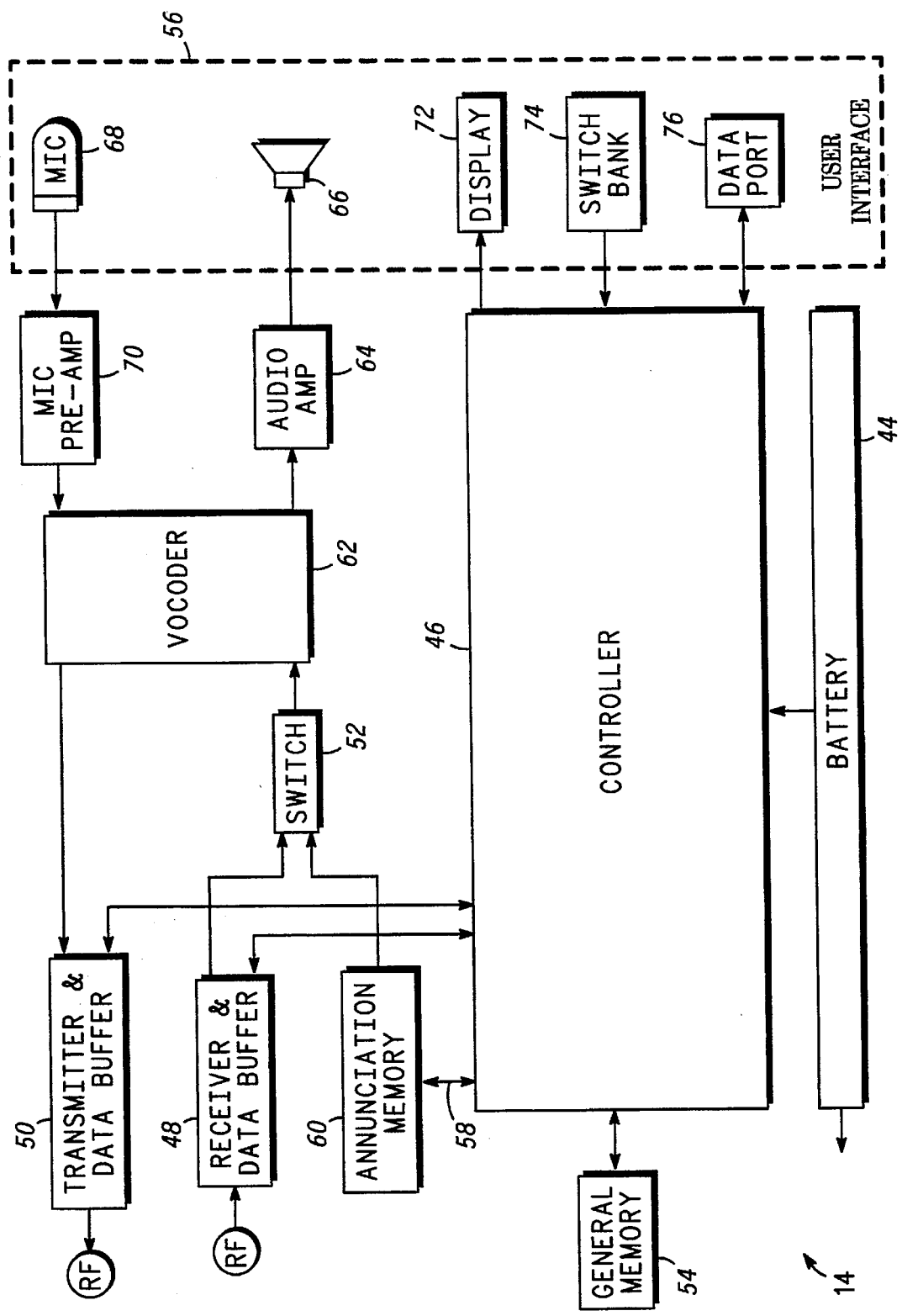
FIG. 3 shows a block diagram of the subscriber unit.

FIG. 3 shows a block diagram of a subscriber unit 14 configured in accordance with the preferred embodiments of the present invention. Subscriber unit 14 may be a portable or mobile, battery-operated, radio device. Thus, subscriber unit 14 includes a battery 44 which supplies electrical energization for all components within subscriber unit 14. For clarity, FIG. 3 omits these power connections.

A controller 46 may be provided by one or more microprocessor circuits. Controller 46 has a data input which couples to battery 44 so that battery voltage may be monitored. Controller 46 additionally couples to a receiver and data buffer 48, a transmitter and data buffer 50, a switch or multiplexer 52, a general memory 54, a user interface 56, and an address/data bus 58 for an annunciation memory 60. Annunciation memory 60, general memory 54, and data buffers associated with receiver 48 and transmitter 50 are preferably provided by semiconductor memory circuits. Those skilled in the art will appreciate that such circuits need not be partitioned in any particular way. However, in one preferred embodiment, annunciation memory 60 represents a permanent or removable memory which may be personalized for a particular user and installed or programmed at the time the user acquires subscriber unit 14 or prior to use of subscriber unit 14.

Receiver 48 receives incoming RF data from network 10 (see FIG. 1) and places such data in its internal data buffer. Controller 46 tunes receiver 48 to specified channels and accesses data in the buffer of receiver 48. System control messages are retrieved and processed by controller 46. Receiver 48 additionally couples to a first input port of switch 52, and a data output of annunciation memory 60 couples to a second input port of switch 52. An output of switch 52 couples to a vocoder 62. Hence, controller 46 determines whether subscriber traffic is routed from receiver 48 through switch 52 to vocoder 62 or whether annunciation data is routed from annunciation memory 60 through switch 52 to vocoder 62.

Vocoder 62 receives digital data from switch 52 and translates such data into an analog audio signal. Preferably, vocoder 62 is configured to expand a stream of correspondingly encoded and compressed digital data supplied at a rate of 2400–4800 baud into conversational quality audio. An analog output of vocoder 62 couples to an audio amplifier 64, and an output of amplifier 64 couples to a speaker 66. Audio, whether annunciations from annunciation memory 60 or subscriber traffic from receiver 48, is presented to a user of subscriber unit 14 through speaker 66.

A microphone 68 couples to an input of a microphone pre-amplifier 70, and an output of pre-amplifier 70 couples to an analog input of vocoder 62. Vocoder 62 digitizes, encodes, and compacts audio obtained from microphone 68 into a digital form compatible with network 10. Vocoder 62 also has an output for outgoing digital data that couples to an input of transmitter 50 so that the encoded data may be placed in a buffer thereof. Transmitter 50 modulates the outgoing data to RF for transmission to network 10.

Speaker 66 and microphone 68, discussed above, are components of user interface 56 because they present information to and collect information from, respectively, a user of subscriber unit 14. User interface 56 additionally includes a display 72, a switch bank 74, and a data port 76, each of which couples to controller 46. Display 72 visually presents annunciations to the user, and switch bank 74 receives inputs from the user. In particular, switch bank 74 includes a conventional keypad along with other switches, such as a power control key, a send key, a hookswitch or its equivalent, and any other keys conventionally used in telecommunication equipment. The hookswitch or its equivalent is manipulated by a user to indicate the answering or the termination of a call. Those skilled in the art will appreciate that subscriber unit 14 need not be limited to conveying audio information, but may convey digital data to and from network 10 as well. Data port 76 is used in transferring such digital data to and from subscriber unit 14.

General memory 54 includes data which serve as instructions to controller 46 and which, when executed by controller 46 cause subscriber unit 14 to carry out procedures which are discussed below in connection with FIGS. 4–7. In addition, memory 54 includes variables, tables, and databases that are manipulated due to the operation of subscriber unit 14.

Figure 4:
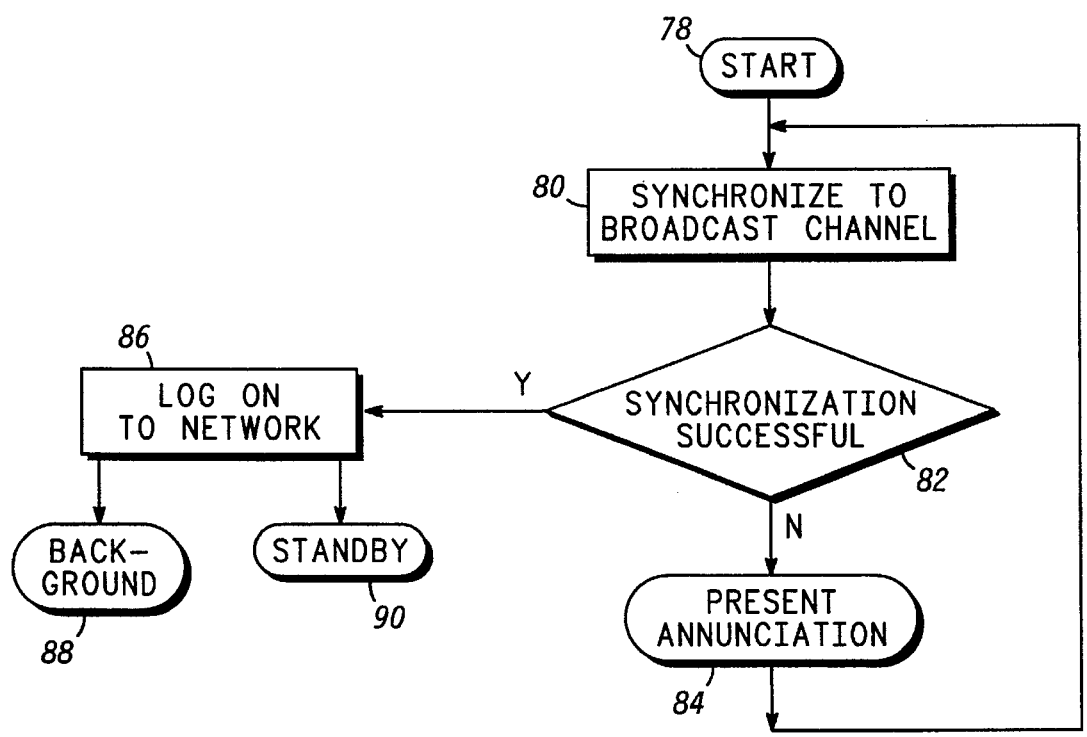
FIG. 4 shows a flow chart of a Start procedure performed by the subscriber unit.

FIG. 4 shows a flow chart of a Start procedure 78, which is performed when subscriber unit 14 is energized or when subscriber unit 14 loses subscriber link 16 (see FIG. 1). Start procedure 78 performs a task 80 to synchronize to or capture a broadcast channel 18 (see FIG. 1) transmitted by an overhead satellite 12 (see FIG. 1). A broadcast channel 18 may be considered captured when subscriber unit 14 can read valid data carried by the broadcast channel 18. Due to variations in Doppler and propagation time of broadcast channels 18, controller 46 (see FIG. 3) may need to instruct receiver 48 (see FIG. 3) to search for some period of time before it can lock onto a broadcast channel 18. In addition, receiver 48 may need to discriminate between multiple broadcast channels 18 transmitted by one or more satellites 12. Accordingly, after an appropriate period of time, a query task 82 determines whether a broadcast channel 18 has been captured.

A subscriber unit 14 may fail to capture a broadcast channel 18 for any one of several reasons. For example, a subscriber unit 14 may be located underground, within a building, or near some interfering structure. When task 82 determines that subscriber unit 14 has failed to capture a broadcast channel 18, program control proceeds to a Present Annunciation procedure 84, which is detailed below in connection with FIG. 7.

Generally speaking, Present Annunciation procedure 84 causes subscriber unit 14 to present an appropriate annunciation to the user of subscriber unit 14. The annunciation may be a voice message, a distinctive audible sound, a visual display, or the activation of an indicator light. In this situation, the annunciation will communicate to the user that communication services through network 10 are not currently available. An audible voice message may go on to explain that movement away from interfering structures may help in obtaining communication services. Accordingly, subscriber unit 14 detects a condition, such as the inability to contact network 10, that warrants the presentation of information describing the condition to the user. Then, subscriber unit 14 presents an appropriate annunciation to the user.

When task 82 determines that a broadcast channel 18 has been captured, a task 86 causes subscriber unit 14 to log-on to network 10. The log-on process is accomplished by causing subscriber unit 14 to transmit a log-on message via a random access channel 20 (see FIG. 1). Network 10, and particularly a nearby CSO 26 thereof, interprets the log-on message as a request for registering the identified subscriber unit 14 to obtain communication services. After subscriber unit 14 logs on to network 10, a Background procedure 88 is enabled, as indicated by a dotted line, and process control concurrently proceeds to a Standby procedure 90. Background procedure 88 is discussed below in connection with FIG. 5, and Standby procedure 90 is discussed below in connection with FIG. 6.

Figure 5:
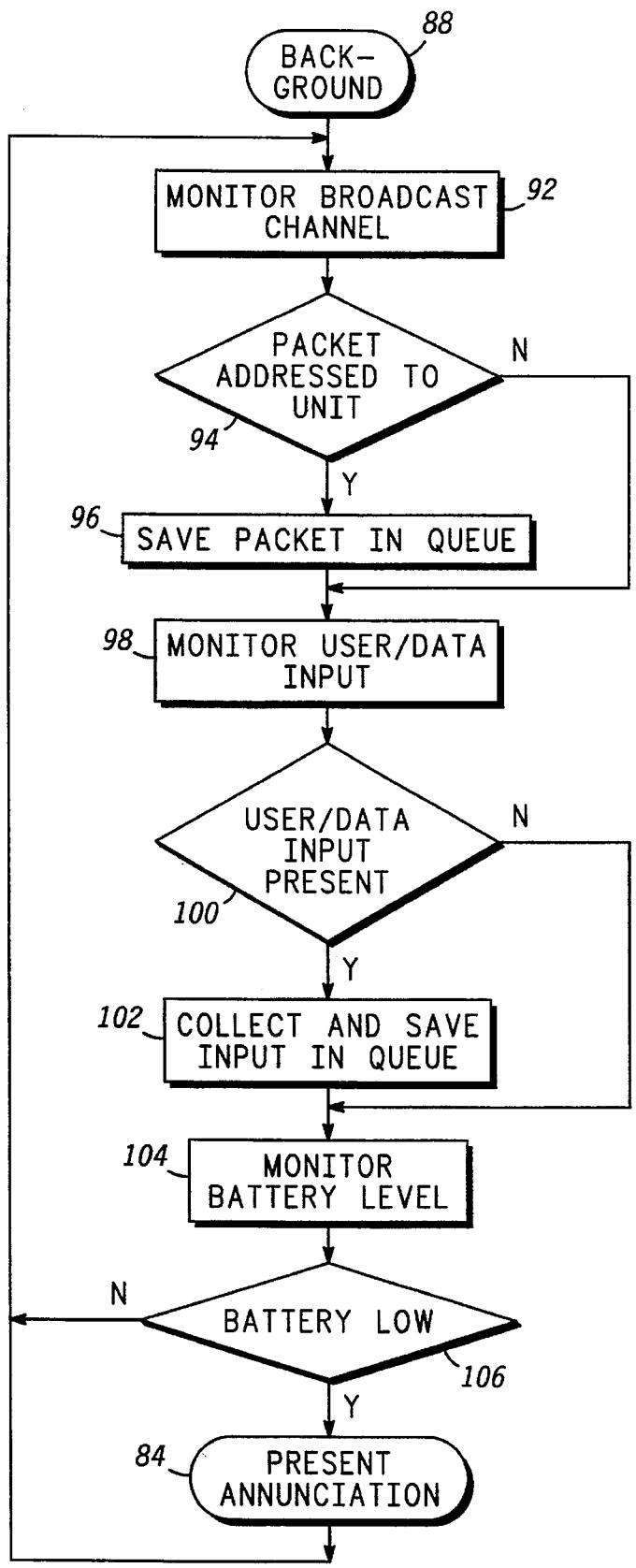
FIG. 5 shows a flow chart of a Background procedure performed by the subscriber unit.

FIG. 5 shows a flow chart of tasks performed by subscriber unit 14 during Background procedure 88. Those skilled in the art will appreciate that Background procedure 88 runs continuously in a background mode even though other procedures, such as Present Annunciation procedure 84 and Standby procedure 90, may be concurrently active. In other words, regardless of other tasks subscriber unit 14 may be currently undertaking, a task 92 of Background procedure 88 is performed to monitor channels broadcast by network 10. A query task 94 evaluates this data to determine if a packet 30 (see FIG. 2) is being directed to the subscriber unit 14. If a packet 30 is being directed to subscriber unit 14, a task 96 saves the payload 38 (see FIG. 2) from the packet 30 in a job queue created in memory 54 (see FIG. 3). Other foreground procedures, such as Standby procedure 90, will evaluate this job queue and treat the data received from the packet 30 as an instruction to take some action.

After task 96 or when task 94 determines that no packet is addressed to the subscriber unit 14, a task 98 monitors user interlace 56 (see FIG. 3) for inputs. Next, a query task 100 determines if a user input is present. If a user input is present, a task 102 collects the input and saves the input in the above discussed job queue. Such user inputs may, for example, indicate that the user of subscriber unit 14 is dialling a phone number or is ready to send the number to network 14 to ring the called party.

After task 102 or when task 100 fails to detect any user input, a task 104 monitors battery level. If the battery is becoming seriously run down, a query task 106 activates Present Annunciation procedure 84. This time, Present Annunciation procedure 84 causes subscriber unit 14 to present an annunciation to the user which informs the user that the battery is low and that continued operation may be unreliable. The low battery level is another example of a condition detected by subscriber unit 14 that warrants the presentation of information describing the condition to the user. After completion of Present Annunciation procedure 84 and when task 106 determines that battery level is within acceptable limits, program control returns to task 92, discussed above, and program control continuously remains in a loop which includes various ones of tasks 92–106.

Figure 6:
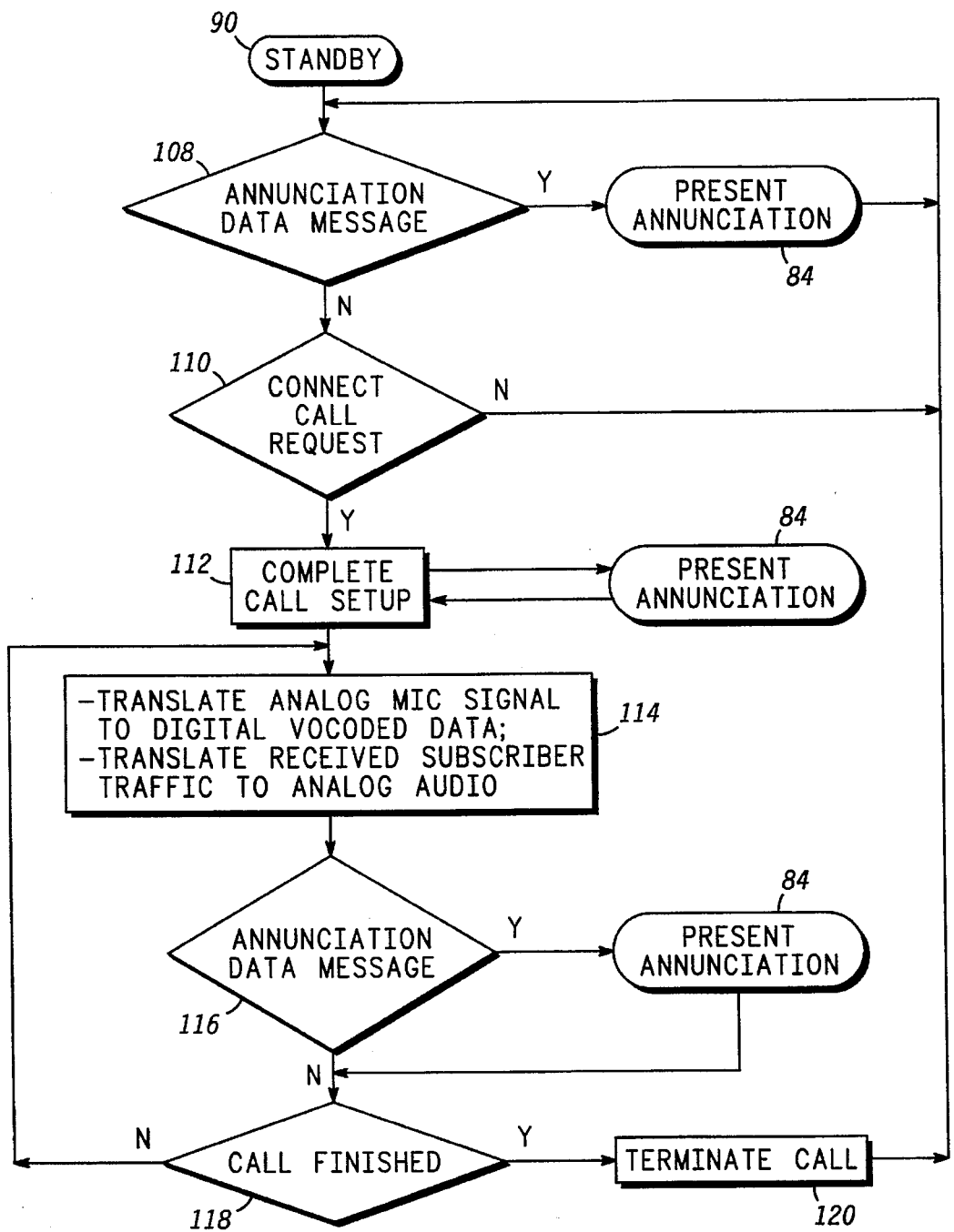
FIG. 6 shows a flow chart of a Standby procedure performed by the subscriber unit.

FIG. 6 shows a flow chart of Standby procedure 90. Procedure 90 includes a query task 108 which detects whether an annunciation data message has been received from network 10. Task 108 may make its determination by evaluating data included in the job queue. When an annunciation data message is present, Present Annunciation procedure 84 is performed to present the annunciation indicated by the message to the user. Those skilled in the art will appreciate that, at this point, an entire annunciation data message has been received by subscriber unit 14. From the perspective of network 10, this communication with subscriber unit 14 has ended, and network 10 may now be using its scarce resources in providing services to other subscriber units 14. Network 10 need not allocate its resources to this subscriber unit 14 until the annunciation has been completely presented to the user. Thus, network 10 has consumed only an insubstantial amount of its resources in delivering the annunciation data message to the subscriber unit 14. After procedure 84 presents the indicated annunciation, program control returns to task 108.

When task 108 fails to detect an annunciation data message, a query task 110 determines whether a connect call request has been received. A connect call request may originate from network 10 when the subscriber unit 14 is the called party in an upcoming call. Thus, task 110 monitors the job queue to determine if a network system message has been received informing subscriber unit 14 of a request to set up a call. Alternatively, a connect call request may be made by the user of subscriber unit 14 when subscriber unit 14 is the calling party in an upcoming call. Task 110 also monitors the job queue to determine if a user input signalling a desire to send a dialled number has been detected from switch bank 74 of user interface 56 (see FIG. 3). If no requests to connect a call are detected, program control returns to task 108, discussed above.

On the other hand, if task 110 detects a request to connect a call, task 112 is performed to complete the call setup process. The preferred embodiments of the present invention contemplate the use of conventional call setup processes known to those skilled in the art of telephony at task 112. For example, when subscriber unit 14 is the called party, a ringing signal is presented to the user, an event equivalent to "answering" is detected, the answering event is communicated to network 10, and receiver 48 and transmitter 50 (see FIG. 3) are tuned to a traffic channel 22 assigned by network 10. If an answering event is not detected, signalling commands from network 10 indicate when the calling party "hangs up" so that ringing at the subscriber unit 14 may be terminated.

When subscriber unit 14 is the calling party, the subscriber unit sends the called party's identifying number to network 10. System messages received back from network 10 during call setup inform the subscriber unit 14 of the progress of the call. A variety of "busy" messages may be sent to subscriber unit 14 when network 10 circuits are unavailable. Another busy message may be sent to subscriber unit 14 when the called party's line or the equivalent is currently in use. A ringing message may be sent to subscriber unit 14 when the called party's telephonic or radio device is ringing. In addition, a variety of other call progress messages may be sent to subscriber unit 14 during call setup so that subscriber unit 14 knows that call setup is progressing. When the called party answers, a network message may communicate the identity of a traffic channel 22 to use in the upcoming call and subscriber unit 14 may then tune its receiver 48 and transmitter 50 to this channel.

As indicated in FIG. 6, network system messages received at subscriber unit 14 during call setup activate Present Annunciation procedure 84. In one embodiment of the present invention, explicit annunciation data messages are received at subscriber unit 14. The explicit annunciation data messages are interpreted by subscriber unit 14 exclusively as commands to present annunciations to the user. Such explicit annunciation data messages include data that directly identify a particular annunciation to present to the user. In another embodiment of the present invention, implicit annunciation data messages are received at subscriber unit 14. Implicit annunciation data messages are interpreted by subscriber unit 14 as commands to present annunciations to the user and possibly to perform other tasks. Subscriber unit 14 may need to translate or otherwise process data conveyed by implicit annunciation data messages in order to identify a particular specified annunciation. In either embodiment, data identifying a specified annunciation are conveyed with the system message.

For example, when subscriber unit 14 receives a system message informing it of an incoming call, subscriber unit 14 may interpret such a message as an instruction to present a ringing signal annunciation to the user. When subscriber unit 14 receives a system message informing it of a busy condition, subscriber unit 14 may interpret such a message as an instruction to present a particular annunciation to the user. This annunciation may be a conventional "busy" sound when the called party's line is currently in use and may be a variety of different voice messages when circuits within network 10 are currently unavailable. A ringing feedback annunciation may be presented when network 10 informs a calling subscriber unit 14 that the called party is being rung. When network 10 informs subscriber unit 14 that the called party has answered, subscriber unit 14 may interpret such a system message as an instruction to cease the ringing feedback annunciation.

Those skilled in the art will appreciate that the precise content of various annunciations is not an important feature in the present invention. Moreover, those skilled in the art will appreciate that system resources are utilized more efficiently by communicating system messages which are interpreted by subscriber unit 14 as instructions to present internally stored annunciations to the user, rather than allocating system resources to establishing audio quality communication links so that audio annunciations may be transmitted from a central switching office to the subscriber units for presentation to users.

After task 112 completes the call setup process, a task 114 essentially manages the ongoing, call. In other words, outgoing analog signals from microphone 68 (see FIG. 3) are translated into outgoing vocoded digital data and transmitted to network 10 via a traffic channel 22 assigned by network 10 for this call. Likewise, incoming digital vocoded data are received from network 10 over the traffic channel 22, decoded, translated into incoming analog audio signals, and presented to the user through speaker 66 (see FIG. 3). Of course, those skilled in the art will appreciate that in order to support real time communications, task 114 is enabled during Standby procedure 90 and performed continuously during a background mode of operation. In other words, subscriber unit 14 may undertake other tasks and procedures during the ongoing call, but subscriber unit 14 continues to perform task 114.

One of the other tasks undertaken by subscriber unit 14 during an ongoing call is a query task 116. Query task 116 monitors the stream of packets 30 (see FIG. 2) received over traffic channel 22 for the presence of a system control message 40 (see FIG. 2). In particular, task 116 detects the presence of an annunciation data message. When such a message is present, Present Annunciation procedure 84 is activated to present the annunciation indicated by the message to the user. When such messages are audible annunciations, controller 46 controls switch 52 to route data from annunciation memory 60 to vocoder 62. After completion of the message, controller 46 sets switch 52 to allow data from receiver 48 to flow to vocoder 62, and program control continues to process the ongoing call.

Accordingly, annunciations, whether audible, visible, or both, may be presented to a user during an ongoing call through the inclusion of a relatively short system control message in one packet 30 from a stream of packets 30 that are being routed to subscriber unit 14. Examples of these annunciations may be call waiting annunciations or annunciations warning users of expected upcoming interruptions in communication services.

A query task 118 is also performed during ongoing calls. Task 118 determines whether the call has finished. The call may be finished when the user of subscriber unit 14 "hangs up." This event may be detected through the operation of Background procedure 88, discussed above, and the monitoring of data in the job queue. In addition, the call may finish when the opposing party hangs up. This situation is detected by monitoring packets 30 (see FIG. 2) for system control messages 40 (see FIG. 2) that signal call termination. So long as the call has not yet finished, subscriber unit 14 continues to manage the ongoing call, as indicated in FIG. 6 by looping back to task 114, discussed above. When the call is finished, a task 120 performs any processes needed to terminate the call, and program control then returns to task 108.

Figure 7:
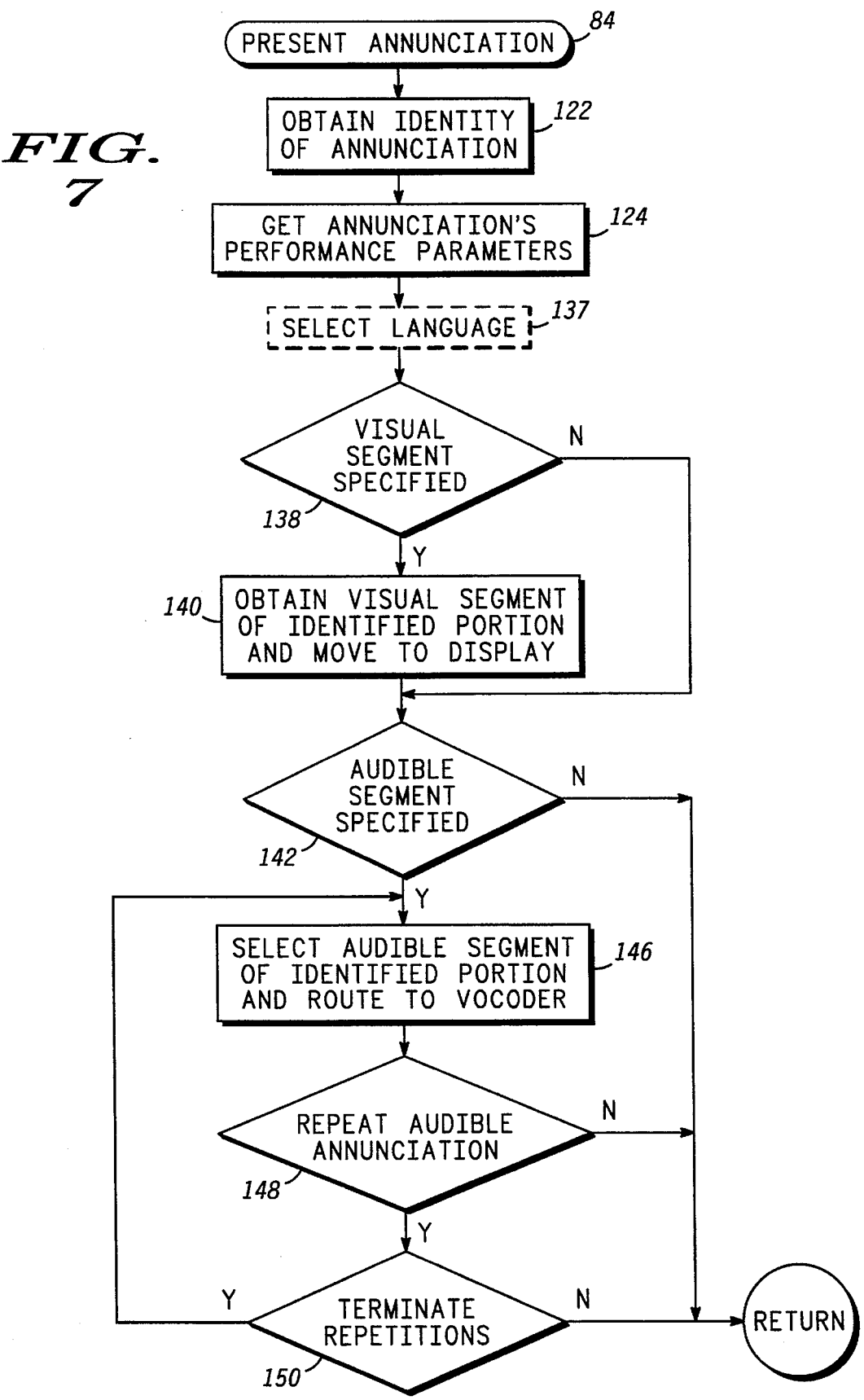
FIG. 7 shows a flow chart of a Present Annunciation procedure performed by the subscriber unit.

FIG. 7 shows a flow chart of tasks performed by subscriber unit 14 during Present Annunciation procedure 84. Procedure 84 performs a task 122 to obtain the identity of an annunciation to be presented to the user. As discussed above, this identity may be explicitly or implicitly communicated to subscriber unit 14. After task 122, a task 124 uses the identity data to get performance parameters for the annunciation. For example, performance parameters may indicate whether to blink visual annunciations, whether to repeat audible annunciations, what conditions to use as a signal to terminate repetitions, and/or a list of separate small annunciations which are chained together to form a large annunciation.

Figure 8:
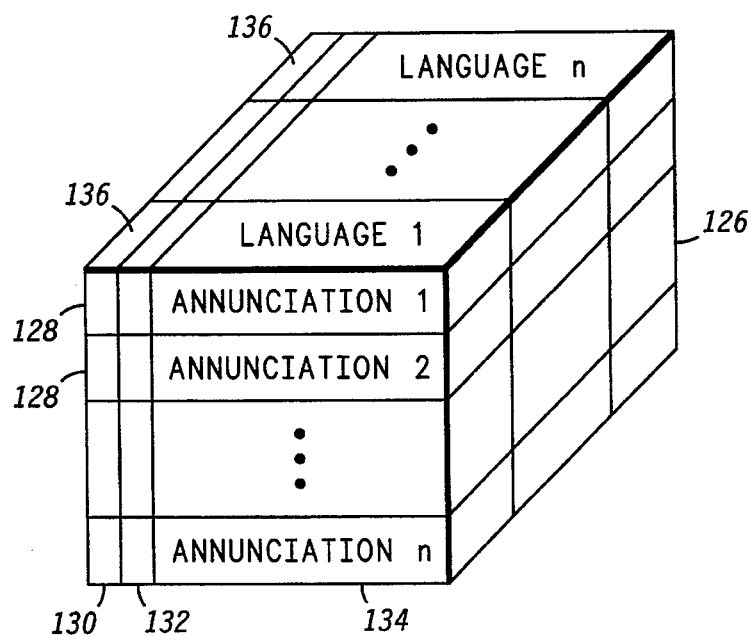
FIG. 8 shows a block diagram of a memory structure maintained in a memory of the subscriber unit.

FIG. 8 shows a block diagram of an exemplary memory structure 126 which may be used by procedure 84 in presenting annunciations. Structure 126 provides a repertoire of annunciations and is preferably maintained in annunciation memory 60 (see FIG. 2). As shown in FIG. 8, structure 126 is divided into discrete annunciation portions 128. Each annunciation portion 128 may include a performance parameter segment 130 that provides the data obtained in task 124 (see FIG. 7). In addition, each annunciation portion 128 may include a visual segment 132 and an audible segment 134. Visual segment 132 contains data that are presented visually at display 72 (see FIG. 3), and audible segment 134 contains data that are presented audibly at speaker 66 (see FIG. 3). An annunciation portion 128 may omit visual segment 132 when an annunciation is exclusively presented audibly or may omit audible segment 134 when an annunciation is exclusively presented visually. Of course, those skilled in the art will appreciate that data stored in audible segment 134 are encoded and compressed so that, when processed by vocoder 62 (see FIG. 3), meaningful audible sounds and language result. The meaningful audible sounds include non-verbal sounds, such as conventional telephonic ringing signals, busy signals, and dial tones. The audible sounds additionally include voice messages expressed in a selected language.

In one embodiment of the present invention, memory structure 126 includes a language dimension so that each annunciation portion 128 is expressed in a variety of different languages 136. However, in a currently more preferred embodiment, a user selects a language within which he or she wishes to receive annunciations at the time of purchase, and structure 126 is programmed into subscriber unit 14 at that time to incorporate only that selected language. In this more preferred embodiment, only one language 136 is included to conserve memory requirements of subscriber unit 14.

With reference back to FIG. 7, after task 124 obtains the identified annunciation's performance parameters, an optional task 137 selects the language to use in presenting the annunciation. Task 137 is performed only when multiple languages 136 (see FIG. 8) are included in memory structure 126 (see FIG. 8). The user may indicate a language selection via switch bank 74, and this selection may then be stored in a variable in memory 54 (see FIG. 3). Of course, if only one language is included in memory structure 126 then task 137 may be omitted.

After task 137, a query task 138 determines whether a visual segment 132 (see FIG. 8) has been requested for this annunciation. This determination may be made by evaluating the performance parameters or by determining whether a visual segment 132 has been included in the selected annunciation portion 128 (see FIG. 8). If a visual segment 132 has been specified, a task 140 obtains the visual segment 132 from the identified annunciation portion 128 and programs display 72 (see FIG. 3) with the data from this segment.

After task 140 and when task 138 determines that no visual segment 132 (see FIG. 8) has been specified for the identified annunciation, a query task 142 determines whether an audible segment 134 (see FIG. 8) has been specified. If an audible segment 134 has not been specified, program control exits procedure 84 and returns to the calling procedure.

When an audible segment has been specified, a task 146 selects the identified audible segment 134 (see FIG. 8) of the identified portion 128 of memory structure 126 by appropriate control of address bus 58 (see FIG. 3). This selected audible segment 134 is then routed to vocoder 62 through switch 52 (see FIG. 3) at an appropriate data rate. After task 146, a query task 148 determines whether the audible annunciation requires repeating. Non-verbal annunciations, such as ringing, feedback ringing during call origination, busy signals, and dial tones typically repeat a small segment of an annunciation until some external event occurs. However, nothing prevents voice messages and other annunciations from being repeated as well. When the annunciation is not repeated, program control exits procedure 84. Performance parameters 130 (see FIG. 8), obtained above in task 124, may be examined to determine whether repetitions are needed.

When the annunciation being presented to the user by procedure 84 is a repeated annunciation, a query task 150 determines whether to terminate repetitions. Performance parameters 130 (see FIG. 8) obtained above in task 124 may specify upon which conditions to terminate repetitions. Such conditions may include the reception of a system control message which instructs that the annunciation be terminated. For example, when a subscriber unit 14 originates a call, a system message may instruct the subscriber unit 14 that the other party has answered the call. In this situation, subscriber unit 14 may terminate the feedback ringing annunciation. Alternatively, busy signals and dial tones may continue until a user hangs up, or the equivalent. When task 150 determines that repetitions need to continue, program control returns to task 146 to repeat the presentation of the annunciation to the user. When task 150 determines that repetitions may terminate, program control exits procedure 84 and returns to the calling procedure.

In summary, the present invention provides an improved subscriber unit and method of operating a subscriber unit. Annunciations are presented to a user in response to the receipt of short system control messages. Consequently, only an insignificant amount of spectrum is used to perform subscriber unit annunciations. Moreover, annunciations are stored within a subscriber unit in a language that is selected by the user. Thus, a user may roam in areas where foreign languages are spoken and still receive voice messages in his or her preferred language. Furthermore, brief system control messages may be interleaved with digitized data packets that carry real time voice conversations. No additional system resources need be allocated to communicate signalling information to the subscriber unit while calls are ongoing.

The present invention has been described above with reference to preferred embodiments. However, those skilled in the art will recognize that changes and modifications may be made in these preferred embodiments without departing from the scope of the present invention. For example, the network with which the subscriber unit communicates need not be a space-based network, but may be any communication system. Moreover, the vocoder described herein may be replaced with a voice synthesizer or other digital-to-audio/voice device. Furthermore, those skilled in the art will readily understand that a wide range in organization and structure of tasks and memory structures may be employed in constructing the present invention. These and other changes and modifications which are obvious to those skilled in the art are intended to be included within the scope of the present invention.

What is claimed is:

1. A method of operating an individual subscriber communication unit (ISCU) that communicates with a communication network, has memory for storing annunciation data, and has a user interface through which a user of said ISCU may perceive annunciations, said method comprising the steps of:

storing said annunciation data in said memory of said ISCU prior to receipt of a call from said communication network, said annunciation data serving as a repertoire of annunciations pre-stored in said ISCU;

monitoring in said ISCU data transmitted from said communication network to detect an annunciation data message, said annunciation data message being initiated by said communication network and interleaved into communication channels existing between said communication network and said ISCU, said annunciation data message conveying system control data that coordinates communication and status with said communication network for instructing said ISCU to present an annunciation, and said annunciation data message conveying data which identify one of said annunciations;

selecting in said memory, when said monitoring step detects said annunciation data message, a portion of said annunciation data, said selected portion of annunciation data being chosen in response to said identifying data; and controlling said user interface with said selected portion of said annunciation data to present said specified annunciation to said user.

2. A method as claimed in claim 1 additionally comprising the step of conducting an ongoing call simultaneously with said monitoring step.

3. A method as claimed in claim 2 wherein said conducting an ongoing call step comprises the steps of:

controlling said user interface to obtain outgoing analog information for communication to said network;

transforming said outgoing analog information into outgoing digital data;

transmitting said outgoing digital data to said network;

receiving incoming digital data from said network;

transforming said incoming digital data into incoming analog information; and controlling said user interface to present said incoming analog information to said user.

4. A method as claimed in claim 1 wherein:

said monitoring step is configured so that said annunciation data message is received over a first period of time; and said controlling step causes said specified annunciation to be presented over a second period of time, said second period of time being greater than said first period of time.

5. A method as claimed in claim 1 wherein said monitoring step receives the entirety of said annunciation message before said controlling step begins.

6. A method as claimed in claim 1 wherein said controlling step comprises the step of visually presenting at least a segment of said selected portion of annunciation data.

7. A method as claimed in claim 1 wherein said controlling step comprises the step of audibly presenting at least a segment of said selected portion of annunciation data.

8. A method as claimed in claim 7 wherein said controlling step comprises the step of visually presenting a segment of said selected portion of annunciation data.

9. A method as claimed in claim 7 wherein said audibly presenting step comprises the step of translating said annunciation data into a voice message.

10. A method as claimed in claim 9 wherein said translating step presents said voice message in a language specified by said user.

11. A method as claimed in claim 7 wherein said user interface is additionally configured to receive an input from said user, and said audibly presenting step is configured so that said annunciation includes a non-verbal sound which continues until said user input is received.

12. A method as claimed in claim 7 wherein:

said audibly presenting step is configured so that said annunciation includes a non-verbal sound which continues until a termination data message is received from said communication network, said termination data message instructing said subscriber unit to terminate an annunciation; and said method additionally comprises, after said controlling step, the step of monitoring data transmitted from said communication network to detect the presence of said termination data message.

13. A method as claimed in claim 1 additionally comprising, prior to said monitoring step, the steps of:

detecting a condition which warrants the presentation of information descriptive of said condition to said user;

selecting from said memory, when said detecting step detects said condition, a second portion of said annunciation data, said selected second portion of annunciation data being chosen in response to said detected condition; and controlling said user interface in response to said second portion of said annunciation data.

14. An individual subscriber communication (ISCU) unit that communicates with a communication network and that presents information to a user of said unit in the form of annunciations, said ISCU comprising:

a receiver for receiving incoming data transmitted from said communication network;

a controller, coupled to said receiver, for monitoring said incoming data to detect an annunciation data message, said annunciation data message being initiated by said communication network and interleaved into communication channels existing between said communication network and said ISCU, said annunciation data message conveying system control data that coordinates communication and status with said communication network for instructing said subscriber unit to present an annunciation, and said annunciation data message conveying data which identify an annunciation;

a memory in said ISCU storing annunciation data in said ISCU prior to receipt of a call from said communication network, said annunciation data serving as a repertoire of annunciations pre-stored in said ISCU;

means, coupled to said memory and said controller, for selecting a portion of said annunciation data from said memory, said selected portion of annunciation data being chosen in response to said identifying data; and a user interface, coupled to said controller, for presenting to said user the one of said annunciations corresponding to said selected portion of said annunciation data.

15. A subscriber communication unit as claimed in claim 14 wherein said controller is configured to control said user interface to conduct an ongoing call while simultaneously monitoring said incoming data to detect said annunciation data message.

16. A subscriber communication unit as claimed in claim 14 wherein:

said annunciation data message is received over a first period of time; and said controller is configured to cause said presented annunciation to be presented over a second period of time, said second period of time being greater than said first period of time.

17. A subscriber communication unit as claimed in claim 14 wherein said user interface comprises a visual display coupled to said controller so that at least a segment of said selected portion of annunciation data is presented visually.

18. A subscriber communication unit as claimed in claim 14 wherein said user interface comprises a speaker coupled to said controller so that at least a segment of said selected portion of annunciation data is presented audibly.

19. A subscriber unit as claimed in claim 18 additionally comprising means, coupled to at least one of said controller and said speaker, for translating said annunciation data into a voice message.

20. A method of operating an individual subscriber communication unit (ISCU) that communicates with a communication network, has memory for storing annunciation data, and has a user interface through which a user of said ISCU may perceive annunciations, said method comprising the steps of:

storing said annunciation data in said memory of said ISCU prior to receipt of a call from said communication network, said annunciation data serving as a repertoire of annunciations pre-stored in said ISCU;

monitoring in said ISCU data transmitted from said communication network to detect an annunciation data message, said annunciation data message being initiated by said communication network and interleaved into communication channels existing between said communication network and said ISCU, said annunciation data message conveying system control data that coordinates communication and status with said communication network for instructing said ISCU to perform an annunciation, said annunciation data message conveying data which identify one of said annunciations, and said annunciation data message being received over a first period of time;

selecting from said memory, when said monitoring step detects said annunciation data message, a portion of said annunciation data, said selected portion of annunciation data being chosen in response to said identifying data;

translating said selected portion of said annunciation data into a voice message; and controlling said user interface to audibly present said voice message to said user, said voice message being presented over a second period of time which is greater than said first period of time.

21. A method as claimed in claim 20 additionally comprising the step of conducting an ongoing call simultaneously with said monitoring step.

22. A method as claimed in claim 21 wherein said conducting an ongoing call step comprises the steps of:

controlling said user interface to obtain outgoing analog information for communication to said network;

transforming said outgoing analog information into outgoing digital data;

transmitting said outgoing digital data to said network;

receiving incoming digital data from said network;

transforming said incoming digital data into incoming analog information; and controlling said user interface to present said incoming analog information to said user.

23. A method of operating an individual subscriber communications unit (ISCU) identified by a unique subscriber ID in a communication system having multiple subscriber units, said ISCU comprising a transceiver, a memory, a controller, a user interface including an annunciator, said ISCU being identified by said unique subscriber ID, said method comprising:

pre-storing in said memory of said ISCU a pre-determined set of messages, each of said messages being identified by a retrieval code;

using said transceiver and controller, monitoring transmissions from the communication system to detect a particular message packet containing said unique subscriber ID for said ISCU, said particular message packet, containing said unique subscriber ID, said message packet being initiated by said communication system and interleaved into a communication channel existing between said communication system and said ISCU, and from said particular message packet extracting said retrieval code conveying system control data that coordinates communication and status with said communication system intended for said ISCU; and actuating said annunciator to announce the particular message of the predetermined set identified by said extracted retrieval code.

24. The method of claim 23, wherein said monitoring step comprises, monitoring transmissions from the communication system to detect a particular message packet containing the unique subscriber ID for said ISCU, testing said particular message packet to determine whether a retrieval code is present in the packet and, if a retrieval code is present, extracting such retrieval code.

25. The method of claim 23, wherein said ISCU further comprises a battery and said monitoring step comprises, monitoring transmissions from the communication system to detect a particular message packet containing the unique subscriber ID for said ISCU, testing said particular message packet to determine whether a retrieval code is present in the packet, extracting the retrieval code, and testing battery status and annunciating a battery status message before or after the message corresponding to the extracted retrieval code.

26. The method of claim 23, wherein said monitoring step comprises, monitoring transmissions from the communication system to detect a particular message packet containing the unique subscriber ID for said ISCU, testing said particular message packet to determine whether a retrieval code is present in the packet and, if a retrieval code is present, extracting such retrieval code and placing said extracted retrieval code in a que within said ISCU.

27. A method of operating an individual subscriber communications unit (ISCU) in a cellular communication system having multiple subscriber units operating in a cell, said ISCU comprising a transceiver, a memory, a controller, a user interface and an annunciator, said ISCU being identified by a unique subscriber ID, said method comprising:

pre-storing in said memory of said ISCU a pre-determined set of messages, each of said messages being identified by a retrieval code;

using said transceiver and controller, monitoring transmissions from the communication system in said cell to detect a message packet containing a retrieval code, said message packet containing said retrieval code, said retrieval code being initiated by said communication system and interleaved into a communication channel existing between said communication system and said ISCU, and from said message packet extracting said retrieval code conveying system control data that coordinates communication and status with said communication system; and actuating said annunciator to announce the particular message of the predetermined set identified by the extracted retrieval code.

28. The method of claim 27, wherein said monitoring step comprises, monitoring transmissions from the communication system in said cell to detect a particular message packet containing a unique subscriber ID for said ISCU, testing said particular message packet to determine whether a retrieval code is present in the packet and, if a retrieval code is present, extracting such retrieval code.

29. The method of claim 27, wherein said ISCU further comprises a battery and said monitoring step comprises, monitoring transmissions from the communication system in said cell to detect a particular message packet containing a unique subscriber ID for said ISCU, testing said particular message packet to determine whether a retrieval code is present in the packet, extracting the retrieval code, and testing battery status and annunciating a battery status message before or after the message corresponding to the extracted retrieval code.

30. The method of claim 27, wherein said monitoring step comprises, monitoring transmissions from the communication system in said cell to detect a particular message packet containing a unique subscriber ID for said ISCU, testing said particular message packet to determine whether a retrieval code is present in the packet and, if a retrieval code is present, extracting such retrieval code and placing said extracted retrieval code in a que within said ISCU.

31. An individual subscriber communication unit (ISCU) for use in a cellular communication system having multiple subscriber units operating in a cell, said ISCU comprising:

a memory in said ISCU having therein a set of predetermined messages pre-stored prior to said ISCU receiving a call, each of said messages being identified by a retrieval code;

a transceiver for communicating with the system;

an annunciator to announce the particular message of the predetermined set identified by a retrieval code; and a controller system in the ISCU, coupled to the memory, the transceiver and the annunciator, for monitoring transmissions from the communication system to detect a particular message packet containing a subscriber ID for said ISCU, said particular message packet, containing said subscriber ID, said message packet being initiated by said communication system and interleaved into a communication channel existing between said communication system and said ISCU, and for extracting from said message packet a retrieval code intended for said ISCU from said particular message packet, said retrieval code conveying system control data that coordinates communication and status with said communication system and for extracting from said memory a predetermined message corresponding to the extracted retrieval code, and for sending such retrieved predetermined message to the annunciator.

* * * * *